CATHODE RAY POLAROGRAPHIC APPARATUS

Filed May 29, 1952 2 Sheets-Sheet 1

Inventor
HERBERT MACDONALD DAVIS,
By
Robert B. Pearson
Attorney

Nov. 29, 1955 H. MacD. DAVIS 2,725,524

CATHODE RAY POLAROGRAPHIC APPARATUS

Filed May 29, 1952 2 Sheets-Sheet 2

*Inventor*

HERBERT MACDONALD DAVIS,

*By* Robert B. Larson

*Attorney*

United States Patent Office 2,725,524

Patented Nov. 29, 1955

2,725,524

CATHODE RAY POLAROGRAPHIC APPARATUS

Herbert MacDonald Davis, Barnehurst, England, assignor to National Research Development Corporation, London, England, a British corporation Application May 29, 1952, Serial No. 290,621

Claims priority, application Great Britain June 2, 1951

6 Claims. (Cl. 324—31)

This invention relates to polarographic apparatus using a cathode ray tube presentation. One such a polarograph is described, for example, in the specification of British Patent No. 631,459.

In apparatus of this kind a potential rising linearly with time is applied to the polarographic cell late in the life of each mercury drop and the graph of the resulting cell current as a function of the voltage applied to the cell is caused to appear on the screen of a cathode ray tube.

One difficulty in the operation of apparatus of this kind arises from the fact that the current through the cell is measured by the voltage drop across a resistor in series with the cell and the impedance of the cell depends on the voltage applied to it. Consequently although a linear potential may be applied to the combination of the resistor and the cell the potential difference across the cell itself is not linear.

Now it is important that the rate of change of voltage on the cell should be substantially constant and it is an object of the present invention to overcome this difficulty wholly or partially.

According to the present invention there is provided a polarographic apparatus using a cathode ray tube presentation and comprising a generator of a substantially linearly rising potential and a compensating circuit for applying a potential derived from the generated potential to the polarographic cell of the apparatus and including means for comparing the potential on the live electrode of the cell with the generated potential and for increasing the input to the cell when the potential on the live electrode is lower than the generated potential and vice versa so that the potential across the cell closely follows the generated potential.

Another difficulty arises from the fact that the polarographic cell has a high internal capacitance and a current equal to the product of the capacitance of the cell and the time rate of change of applied voltage will flow through the cell and the series resistor.

To a first approximation the capacitance of the cell during the end of the life of the mercury drop may be taken as constant and according to a feature of the invention there is provided means for compensating, wholly or partially, the effect of the capacitance of the cell.

The invention will be described, by way of example, with reference to the accompanying drawings of which:

Figures 1, 3:
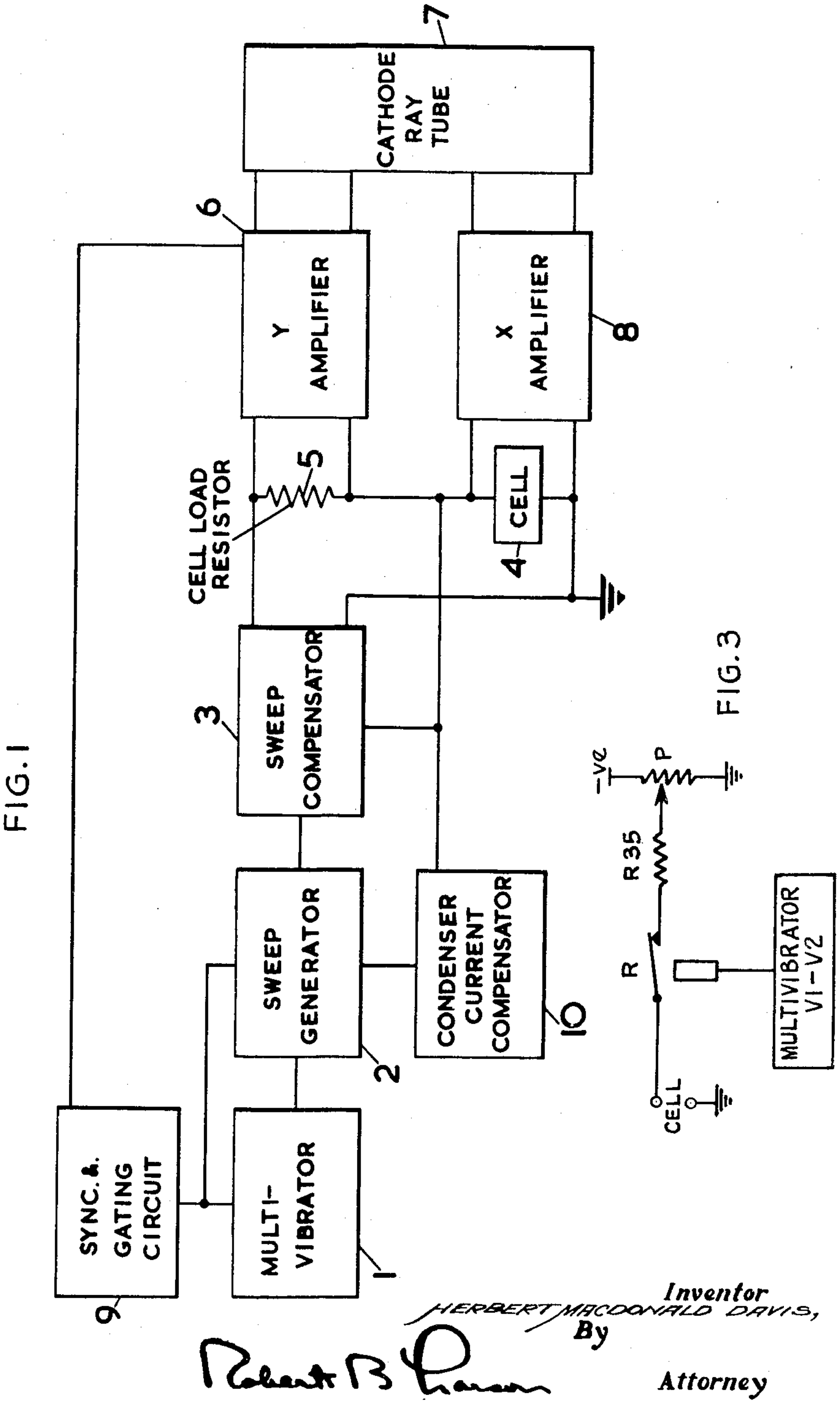
Figure 1 is a schematic diagram of a circuit according to the invention.
Figure 3 is a schematic diagram of a capacitance compensating circuit.

In Figure 1 there is shown a multivibrator 1 having unequal metastable states which can be synchronised with the fall of the mercury drop in the polarographic cell. The multivibrator 1 controls a linear sweep generator 2 in such a way that the generator 2 is quiescent for a period of about five seconds while the drop is growing and active for about two seconds, after which the drop falls.

The linearly rising potential generated in the generator 2 is applied via a sweep compensator 3 to the polarograph cell 4 and a resistor 5 in series. The sweep compensator 3 will hereinafter be more particularly described and its function is to maintain a substantially constant rate of change of potential across the terminals of the cell 4.

A further compensating circuit 10 designed to compensate, wholly or in part, the capacity effect of the cell 4 is included in the circuit and modifies the output of the generator 2. The circuits 3 and 10 are both fed with the potential across the cell 4, as shown.

The voltage developed across the cell load resistor 5 is applied to the input of the Y amplifier 6 which feeds the Y plates of a cathode ray tube 7. The voltage across the cell 4 itself is applied to the X amplifier 8 which feeds the X plates of the cathode ray tube 7.

Conveniently the screen of the tube 7 has a long afterglow.

The multivibrator 1 and the generator 2 are controlled by a synchronising and gating circuit 9 which is itself fed with a signal when the drop falls. This signal may conveniently be obtained from the output of the Y amplifier 6 because when the drop falls the current, and hence the output from 6, suddenly falls.

Figure 2:
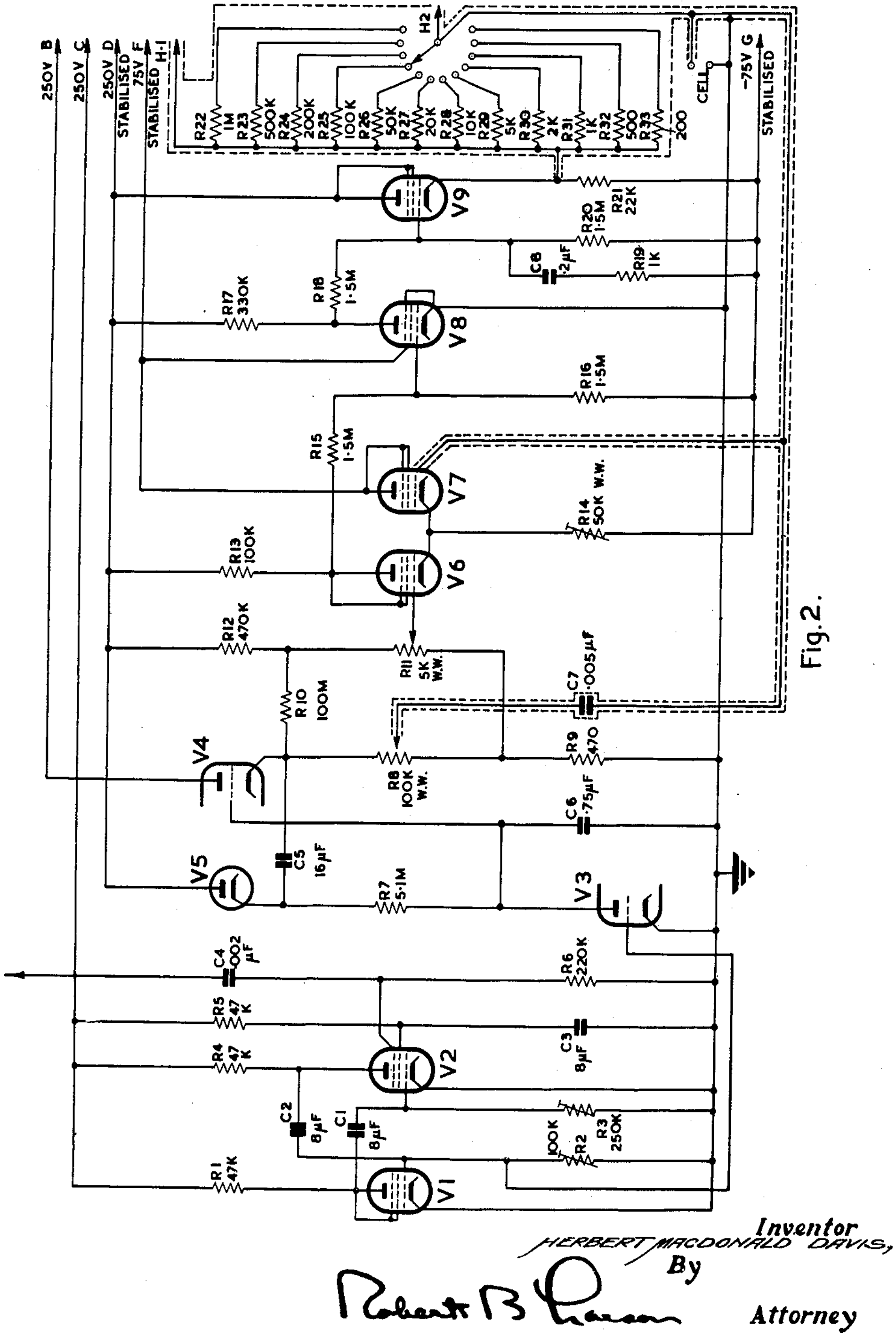
Figure 2 is a detailed circuit of part of the general circuit shown in Figure 1.

Details of the circuit shown in Figure 1 are shown in Figure 2. In this Figure 2 the valves V1 and V2 are the two valves of the multivibrator 1 which controls the durations of the quiescent period and the voltage sweep period, and is a normally free running multivibrator having metastable states lasting for about 5 seconds and about 2 seconds respectively. One valve of the pair (V2) is, however, a pentode and the synchronising pulse derived from the fall of the drop is applied, after suitable shaping, to the suppressor grid by the differentiating circuits C4 and R6 so as to drive this grid negative. Before the arrival of this pulse, V2 is conducting and V1 is cut off. When the suppressor grid of V2 is made strongly negative, anode current in this valve is cut off, the grid of V1 is driven positive and the potential of the anode of V1 falls, thereby maintaining V2 cut off. This condition corresponds to the quiescent period of the sweep generator and continues until the potential of the grid of V2 has risen to the cut-off level. By this time the negative-going pulse applied to the suppressor of V2 has decayed to zero and V2 can again pass current. Cumulative action follows and V2 is then in full current and V1 is cut off. The voltage sweep then starts and is continued until the next negative-going pulse is received at the suppressor grid of V1, when the cycle repeats.

If the synchronising pulse is, for any reason, of insufficient amplitude to trigger the multivibrator into the "quiescent" state, the sweep is always terminated at the end of the normal period of the multivibrator. The synchronising pulse may conveniently be taken from the output of the Y amplifier.

No action is required by the operator to establish synchronisation, assuming a reasonable choice of cell series resistor has been made, other than to make the dropping time of the mercury cathode slightly less than seven seconds, the normal period of the multivibrator, synchronisation will then automatically be established after a few cycles.

The functions of sweep generation and compensation for the ohmic drop occurring in the cell series resistor have been separated and are performed by separate circuits.

The potential sweep is generated at a high level using a form of the well-known "bootstrap" circuit, which is controlled by the multivibrator. The excursions of the grid of V1 are impressed upon the grid of V3 which serves as a switch across the timing condenser C6. Hence when V1 is passing current, V3 effectively short circuits C6 and when V1 is cut off current flows through R7 into C6, thereby initiating the sweep. The form of bootstrap circuit shown does not generate a perfectly linear sweep but almost perfect linearisation may be achieved by a known method. See for example Bernard Newsam's British patent specification No. 493,843.

A small fraction of the rise in potential which occurs at the cathode of V4 is selected by the network R8, R9, R10, R11, R12 and appears at the slider of R11. The network is so designed that the potential of the slider during the quiescent period may be varied relative to earth through a range of 2.5 volts, the amplitude of the potential sweep remaining substantially constant at all settings of the slider.

The voltage applied to the grid of V6 thus consists of a steady voltage, which may be varied at will, plus a linearly rising potential applied late in the life of each drop.

The compensation circuit includes V6, V7, V8 and V9. V6 and V7 together serve as a comparator stage. The potential appearing at the slider of R11 is applied to the control grid of V6, and that appearing across the cell terminals to the grid of V7.

If, for example, due to an increase in cell current, the potential of the control grid of V6 tends to fall relative to that of the control grid of V7, the effect is that current in R14 is decreased, with a consequent fall in potential at the anode of V6. This change increases the voltage at the anode of the amplifying valve V8 and hence the voltages at the cathode of V9 and the cell anode H2 i. e. the action is such as to restore the voltage relation existing between the control grids of V6 and V7 before the increase in cell current occurred. A similar restoring action takes place should the cell current for any reason fall.

The basic voltage relation between the control grids of V6 and V7 may be varied over a small range, by suitable choice of R14, while retaining satisfactory operation of this circuit. In the circuit described, R14 is so chosen that the control grid potential of V7 is 0.75 v. negative with respect to that of V6. By this means, the voltage relative to earth of the cell anode may be varied from $-0.5$ to $+2.0$ volts during the quiescent period by adjustment of R11. This voltage range is required in some applications of the polarograph.

When very dilute solutions are under examination, the polarographic cell may be regarded as electrically equivalent to a high resistance in parallel with a capacitance of about 1 microfarad. It will be seen that, when the potential sweep is applied, an approximately constant current will flow into the capacitative part of the cell impedance, governed by the relation $i=Cdv/dt$ (with the usual notation). As high values of cell load resistance are necessary in order to achieve great sensitivity, this current causes a voltage step to be injected into the Y amplifier of sufficient magnitude to deflect the cathode ray tube spot from the screen.

For example, in the apparatus now described, the cell load resistance may be $10^6$ ohms, $dv/dt=0.2$ volt/sec. Hence the voltage injected into the Y amplifier during the sweep is about 0.2 volt. With amplifying equipment of the sensitivity employed, this input is sufficient to produce a deflection of the spot equivalent to five screen diameters and difficulty in the location of the trace arises.

This effect has been overcome by two methods. In one (not shown in the circuit of Fig. 2, but illustrated in Fig. 3), a current is caused to flow in the cell during the quiescent period, through a high resistance R35, from the slider of a potentiometer P connected between the negative supply rail and earth. This current is interrupted during the sweep by means of a high speed relay R operated by the multivibrator V1, V2. The quiescent current is adjusted by means of the potentiometer until no significant rise in potential takes place across the cell series resistor when the sweep commences. This method has the advantage that once the current control is set only minor variations are required thereafter from determination to determination. One disadvantage, however, is the extreme difficulty of avoiding a peak of short duration at the start of the trace, due to the flow of both the compensation and cell capacity currents in the circuit during the switching time of the high speed relay. Another lies in the fact that a considerable shift potential is still required at the input of the amplifier, to back off the standing potential across the cell load resistor. Neither of these objections is very serious, however, and the method has been found of considerable practical utility.

A second method depends on the injection of a substantially constant current into the cell circuit, during the sweep period, of sufficient magnitude to produce the required rate of change of voltage across the capacitative part of the cell impedance, thereby eliminating that part of the voltage drop across the load resistor due to the cause mentioned above and leaving the main compensation circuit to deal only with effects due to fluctuation in the resistive component of the cell. This method may readily be accomplished by connecting a capacitor C7 of suitable value between the anode of the cell and a potential divider in the cathode circuit of V4. In the circuit described, the rate of change of voltage of cathode V4 is 40 volts/sec. i. e. 200 times that applied to the cell, during the sweep. With the cell capacitance about 1 $\mu$f. it follows that C7 should be 0.005 $\mu$f. Fine setting of the current is accomplished by varying the control R8. The method has the advantages that the whole of the available shift voltage can be applied to backing off the voltage across the cell series resistor, arising from diffusion current flow in the cell, and to measurement of the magnitude of peaks occurring on the trace due to ionic deposition, and that any changes in the cell capacity current arising from variations in the rate of sweep are automatically compensated.

The circuit components in one practical embodiment had the values indicated in the accompanying drawing and the values were as follows:

| | |
|---|---|
| V1 | EF91 |
| V2 | EF91 |
| V3, V4 | 6SL7GT |
| V5 | EA50 |
| V6 | EF37 |
| V7 | EF37 |
| V8 | EF37 |
| V9 | EF42 |

In some cases (for example when steps in the polarographic curve occur near together) it is very advantageous to apply a voltage proportional to the time derivative of the current through the polarographic cell to the Y plates of the cathode ray tube and in these cases the voltage across the series resistor may be applied to the input of the Y amplifier through a differentiating circuit such as a capacitor in series with a resistor.

If the time constant of this combination is sufficiently small the voltage across the resistor will be approximately proportional to the time derivative of the current through the polarographic cell.

In the embodiment shown in the drawings I used a capacitor of 1000 pf. and a resistor of 3.9 megohms.

What I claim is:

1. A polarographic apparatus which employs a cathode ray tube presentation and comprising a generator of a substantially linearly rising potential, a polarographic cell having two electrodes, means for applying said substantially linearly rising potential to an input grid of a first thermionic valve, means connected between the output of said valve and one electrode of said cell for applying a potential derived from the output from this first valve to the polarographic cell of the apparatus, a second thermionic valve having a cathode load which is common with that of the first valve, means connected between the input grid of said second valve and said one electrode of said cell for applying the potential on the electrode of the cell to the input grid of the second valve so that the output from the first valve is increased when the potential of said electrode of the cell falls below the generated potential and vice versa and so that the potential across the cell closely follows the generated potential.

2. A polarographic apparatus as claimed in claim 1 and in which the means for applying the generated potential to the first valve comprises a resistance network arranged so that the generated potential may be applied to the first valve on an adjustable steady potential.

3. A polarographic apparatus as claimed in claim 2 and comprising a capacitor connecting said one electrode of the polarographic cell to the resistance network so that when the linear rising potential is applied to the cell a substantially constant current is injected into the cell circuit of sufficient magnitude to compensate the effect produced by the current flowing due to the electrical capacitance of the cell.

4. A polarographic apparatus which employs a cathode ray tube presentation and which comprises a generator of a substantially linearly rising potential, a polarographic cell having two electrodes, and a compensating circuit connected between the said generator and the said cell for applying a potential derived from the generated substantially linearly rising potential to one electrode of the said cell, the said compensating circuit comprising means connected to the said one electrode for comparing the potential thereon with the said generated potential and for increasing the input to the cell when the potential on the said one electrode is lower than the said generated potential and vice versa so that the potential difference across the cell closely follows the generated potential.

5. A polarographic apparatus as claimed in claim 4 and comprising a free running multivibrator having two metastable states, synchronising means connected between Y-plates of the presentation cathode ray tube and the said multivibrator for changing the said multivibrator to a first state when the dropping electrode of the polarographic cell falls so that the multivibrator changes to a second state a predetermined time after the said dropping electrode falls, the multivibrator being connected to the said generator to hold it quiescent when in the said first state and to initiate the generation of the substantially linearly rising potential when in the second state.

6. A polarographic apparatus as claimed in claim 5 and comprising a high speed relay operated by the multivibrator and having contacts connected to switch a subsidiary current to flow in the cell while the multivibrator is in the first state but to inhibit this subsidiary current when the multivibrator is in the second state, means for adjusting the magnitude of this subsidiary current so that no significant change in the cell current, due to the electrical capacitance of the cell, occurs at the instant at which the multivibrator changes its state.

References Cited in the file of this patent

UNITED STATES PATENTS

| | | |
|---|---|---|
| 2,246,981 | Matheson et al. | June 24, 1941 |
| 2,267,551 | Cherry | Dec. 23, 1941 |
| 2,628,268 | Kerns | Feb. 10, 1953 |
| 2,666,891 | Weidmann | Jan. 19, 1954 |